(12) United States Patent
Gu

(10) Patent No.: US 6,712,167 B2
(45) Date of Patent: *Mar. 30, 2004

(54) TRANSMISSION SYSTEM FOR ELECTRICAL TWIST VEHICLE

(75) Inventor: Hong-Jiun Gu, 6 Fl. No. 67, Lane 27, Alley 372, Sec. 5, Chung Hsu East Road, Taipei (TW)

(73) Assignees: Hong-Jiun Gu, Taipei (TW); Jar Chen Wang, Cerritos, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 09/967,800

(22) Filed: Oct. 1, 2001

(65) Prior Publication Data

US 2002/0084616 A1 Jul. 4, 2002

(51) Int. Cl.[7] ............................................... B62K 11/00
(52) U.S. Cl. ........................ 180/205; 280/218; 280/240
(58) Field of Search .................... 180/205, 65.1, 180/65.6, 217; 280/218, 240, 1.181, 246, 242.1

(56) References Cited

U.S. PATENT DOCUMENTS

| | | | | |
|---|---|---|---|---|
| 729,197 A | * | 5/1903 | Mathieu | 180/205 |
| 3,759,339 A | * | 9/1973 | Farrow | 180/295 |
| 3,807,760 A | * | 4/1974 | Jordan | 280/218 |
| 3,902,739 A | * | 9/1975 | Kimura | 280/249 |
| 4,267,898 A | * | 5/1981 | Wheaton | 180/219 |
| 6,386,304 B1 | * | 5/2002 | Wang | 280/218 |
| 6,464,029 B2 | * | 10/2002 | Gu | 180/65.6 |
| 6,499,755 B2 | * | 12/2002 | Gu | 280/210 |
| 6,502,843 B1 | * | 1/2003 | Gu | 280/218 |

* cited by examiner

Primary Examiner—Daniel G. DePumpo
(74) Attorney, Agent, or Firm—Raymond Y. Chan; David and Raymond Patent Group

(57) ABSTRACT

An electrical twist vehicle includes a transmission system which enables a rider to selectively switch between electrically operated mode and manually operated mode for two rear wheels of the electrical twist vehicle by shifting a control member into a predefined position. In electrically operated mode, the two rear wheels of the electrical twist vehicle are driven by an electrical driving device whereas in manually operated mode, the two rear wheels of the electrical twist vehicle are set to free rotating. The transmission system includes a driving wheel connected to an electrical driving device, a driven wheel connected to a rear wheels axle, a transmission belt connecting the driving and driven wheel, and a biasing wheel wherein in electrically operated mode. The biasing wheel is adapted to bias against the transmission belt for increasing its tension, so that the driving wheel is capable to drive the two rear wheels, and wherein in manually operated mode, the biasing wheel is adapted to move away from the transmission belt for reducing its tension, so that the two rear wheels are capable to rotate freely.

12 Claims, 4 Drawing Sheets

TRANSMISSION SYSTEM FOR ELECTRICAL TWIST VEHICLE

BACKGROUND OF THE PRESENT INVENTION

1. Field of Invention

The present invention relates to a transmission system, and more particularly to a transmission system for electrical twist vehicle, in which a rider is able to switch between electrically operated mode and manually operated mode for two rear wheels of the electrical twist vehicle by shifting a control member into a predefined position.

2. Description of Related Arts

Conventional vehicles for children are usually designed merely for one particular mode of operation, namely electrically operated or manually operated. In other words, children can only drive the conventional vehicles in one particular way—either with the help of electrical devices or simply drive the vehicles manually. However, those who drive with electrically operated vehicles often find they are inconvenient or even difficult to drive manually with the same vehicles when they want to do so or just simply in case of low battery. The reason is that conventional electrically operated vehicles usually have their driving wheels connected to driving devices (such as motors) by some sorts of mechanical linkages. These mechanical linkages and the driving devices themselves possess considerable resistance if the wheels are subjected to rotate manually.

SUMMARY OF THE PRESENT INVENTION

A main object of the present invention is to provide a transmission system for electrical twist vehicle wherein a rider is able to selectively operate the vehicle manually or electrically, by shifting a control member into a predefined position.

Another object of the present invention is to provide a transmission system for electrical twist vehicle wherein when the electrical twist vehicle is adapted to be operated manually, all the wheels can be rotated freely.

Another object of the present invention is to provide a transmission system for electrical twist vehicle wherein when the electrical twist vehicle is adapted to be operated electrically, two rear wheels of the electrical twist vehicle are driven to rotate by a electrical driving device attached in the vehicle frame.

Accordingly, in order to accomplish the above objects, the present invention provides an electrical twist vehicle which comprises a vehicle frame, a steering unit connected to a twisting unit through a transmission unit such that when clockwise and anti-clockwise movements are subsequently imparted to the steering unit, so as to the twisting unit, the twisting unit rotates accordingly as a result, causing the twist vehicle to move forwardly, and a transmission system which comprises the control member incorporated with a handle, a control panel for restricting movement of the control member, a connecting rod pivotally connected to the control member, a transmission rod pivotally connected to the connecting rod, and a biasing wheels connected to the transmission rod, such that when a rider of the electrical twist vehicle shifts the control member to electrically operated mode on the control panel, the biasing wheel will bias against the flexible transmission belt so as to increase the tension of the transmission belt, causing the electrical twist vehicle to be operated electrically.

DETAILED DESCRIPTION OF THE PREFERRED EMBODIMENT

Figure 1:
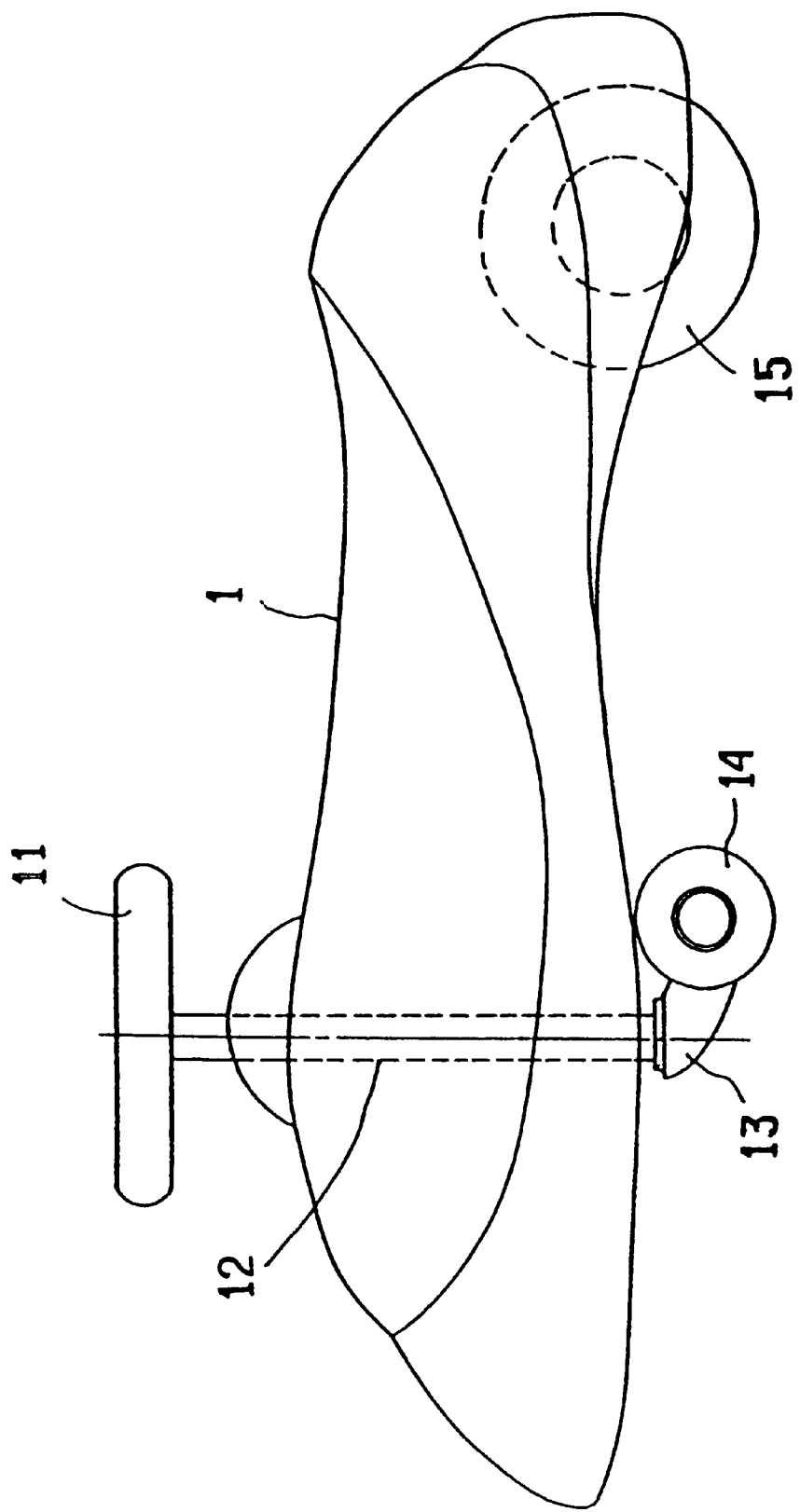
FIG. 1 is a side view of an electrical twist vehicle.

Referring to FIG. 1 of the drawings, an electrical twist vehicle comprises a vehicle frame 1, a steering unit 11, a transmission unit 12 rotatably connected to the vehicle frame 1, a twisting unit 13, and a pair of twisting wheels 14 connected to two side portions of the twisting unit 13, wherein the transmission unit 12 has one end portion connected to the steering unit 11 and another end portion connected to the twisting unit 13 in such a manner that the two twisting wheels 14 are spacedly apart from each other and from the transmission unit 12. When clockwise and anticlockwise movements are manually and subsequently imparted to the steering unit 11, the transmission unit 12 and therefore the twisting unit 13 are driven to rotate accordingly, causing the electrical twist vehicle to move as a result.

Figure 2:
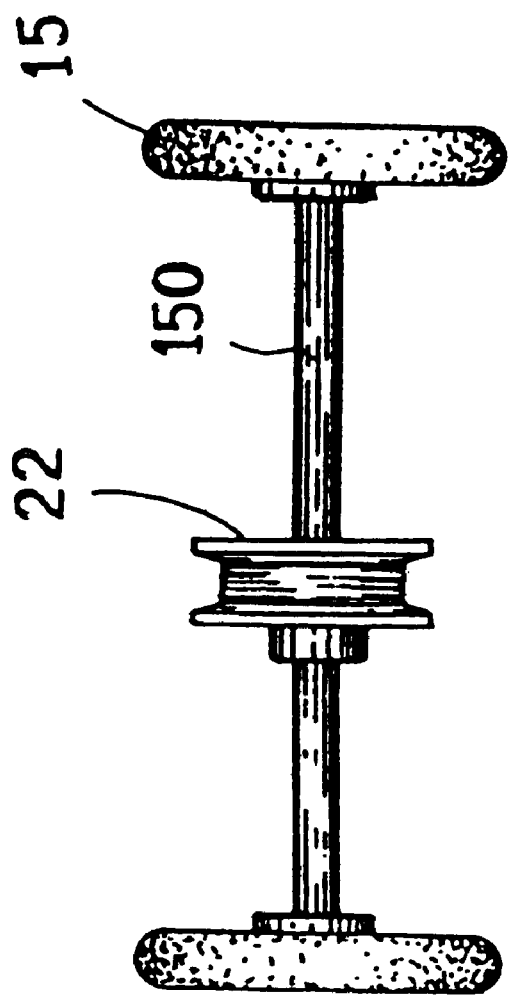
FIG. 2 is a schematic drawing of a rear wheels axle of the electrical twist vehicle, according to a preferred embodiment of the present invention.
Figure 3:
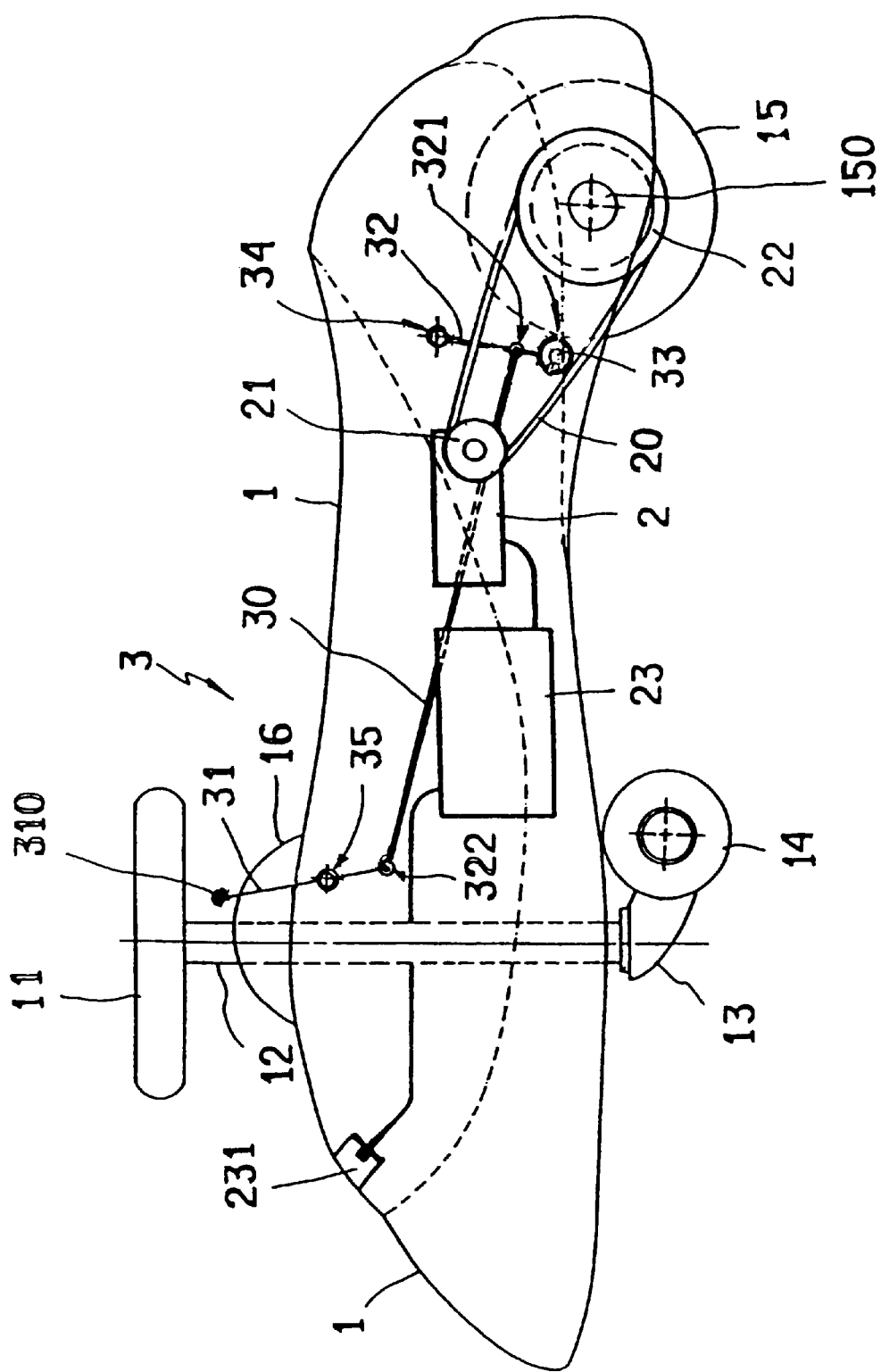
FIG. 3 is a side view of the transmission system for the electrical twist vehicle, according to the above preferred embodiment of the present invention.

Referring to FIGS. 2–3 of the drawings, the transmission system for electrical twist vehicle comprises a pair of rear wheels 15, a rear wheel axle 150, a driven wheel 22, a transmission belt 22, a driving wheel 21, an electrical driving device 2, a battery 23 and a charging inlet 231. The pair of rear wheels is rotatably attached at two sides of rear portion of the vehicle frame 1 and shares the same rear wheel axle 150. The driven wheel 22 is rigidly connected to the rear wheel axle 150 and can be driven by the driving wheel 21 through the transmission belt 22. The driving wheel 21 is directly connected to the electrical driving system, which is driven by the battery 23. The battery 23 can be charged up through a charging inlet 231 attached on the vehicle frame 1.

Figure 4:
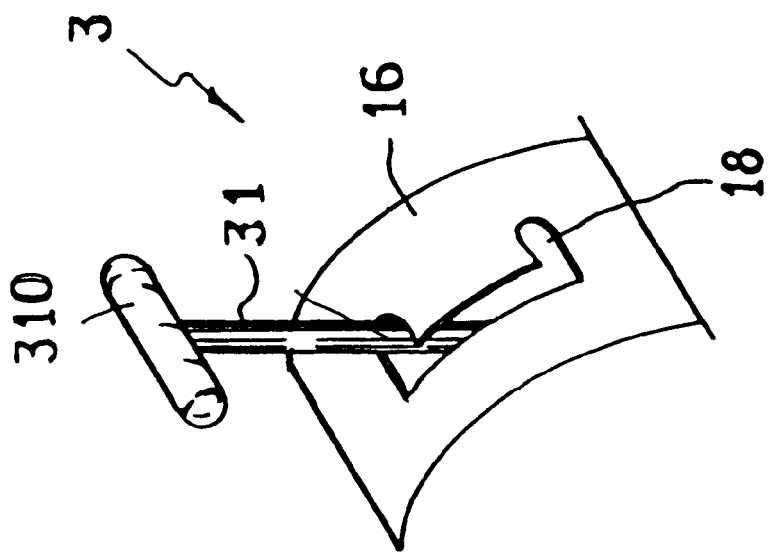
FIG. 4 is a schematic diagram of the control panel for the electrical twist vehicle, according to the above preferred embodiment of the present invention.

Referring to FIGS. 2–4 of the drawings, the transmission system for electrical twist vehicle further comprises a transmission device 3 which comprises a control member 31 incorporated with a handle 310, a connecting rod 30, a transmission rod 32 and a biasing wheel 33. The control member 31 is pivotally connected to the vehicle frame 1 about a first pivot 35 and pivotally connected to the connecting rod 30 such that any pivotal movement of the control member 31 will induce a movement of the connecting rod 30. The connecting rod 30 is further pivotally connected to the transmission rod 32 about a second pivot 321 in which the transmission rod 32 is connected to a biasing wheel 33 and pivotally connected to the vehicle frame 1 about a supporting point 34.

Referring to FIGS. 2–4 of the drawings, the transmission system for electrical twist vehicle further comprises a control panel 16 attached on the vehicle frame 1 for guiding the movement of the control member 31 as shifted by a rider of the electrical twist vehicle. The control panel 16 has two retaining slots 18 and a transmitting slot 17 integrally in between the two retaining slots 18. By shifting the position of the control member 31 between the two retaining slots 18 through the transmitting slot 17, the electrical twist vehicle is capable to be switched between electrically operated mode and manually operated mode.

Referring to FIGS. 2–4 of the drawings, in manually operated mode, the control member 31 is shifted to one of the retaining slot 18 such that the biasing wheel 33 does not bias against the transmission belt 20, so as to create a loosening state for the transmission belt 20. In doing so, the pair of rear wheels 15 is capable to rotate without significant resistance from the electrical driving device 2 and the friction between the transmission belt 20 and the driven wheels 22. When clockwise and anti-clockwise movements are subsequently imparted to the steering unit 11, the transmission unit 12 and the twisting unit 14 rotate accordingly. Since the pair of twisting wheels 14 are spacedly apart from the axis of rotation, the twist vehicle are driven to move forwardly amid a series of twisting motions of the twisting unit 14.

In electrically operated mode, the control member 31 is shifted to another retaining slot 18 through the transmitting slot 17. The pivotal movement of the control member 31 causes the connecting rod 30 and then the transmission rod 32 to move accordingly. When the control member 31 is fixed in another retaining slot 18, the transmission rod 32 is moved in such a manner that the attached biasing wheel 33 bias significantly against the transmission belt 20 so as to increase the tension of the transmission belt 20 and therefore the friction between the transmission belt 20 and the two wheels—driving wheel 21 and driven wheel 22. The driven wheel 22 and so as the pair of rear wheels 15 are then ready to be driven by the electrical driving device 2 by means of the transmission belt 20. In the electrically operated mode, the pair of twisting wheels 14 acts as a pair of steering wheels directed by the steering unit 11. It is worth to mention that by reversing the polarity of the electricity supplied to the electrical driving device 2, the electrical twist vehicle is capable to move forwardly and backwardly with respect to the vehicle frame 1.

What is claimed is:

1. An electrical twist vehicle, comprising:
   a vehicle frame;
   a transmission unit having a driving portion extended above said vehicle frame and rotatably connected to said vehicle frame;
   a steering unit connected to said driving portion connected to said transmission unit;
   a pair of twisting wheels attached spacedly apart from each other and spacedly apart from said front portion of said twisting unit; such that when clockwise and anti-clockwise movements are subsequently imparted to said steering unit, said transmission unit and therefore said twisting unit turn accordingly as a result, causing said electrical twist vehicle to move forwardly amid a series of twisting motion of said pair of twisting wheels;
   a pair of rear wheels rotatably attached on rear portion of said vehicle frame through a rear wheel axle; and
   a transmission system comprising:
   an electrical driving device which is supported by said vehicle frame for driving said rear wheels of said electrical twist vehicle to rotate; and
   a transmission device which comprises:
   a driving wheel operatively connected to said electrical driving device;
   a driven wheel coaxially connected to said rear wheel axle between said two rear wheels;
   a transmission belt for connecting said driving wheels with driven wheels;
   a biasing wheel moveably supported in said vehicle frame and arranged to bias against said transmission belt;
   a control member which is arranged to shift said electrical twist vehicle between a manually operated mode and an electrically operated mode, wherein by shifting said control member to said electrically operated mode, said biasing wheel is driven to bias against said transmission belt so as to increase tension of said transmission belt, such that said driving wheel is capable of driving said driven wheel and therefore said pair of rear wheels to rotate, and wherein by shifting said control member to said manually operated mode, said biasing wheel is moved away from said transmission belt so as to loosen said transmission belt, such that said driven wheel and therefore said pair of rear wheels are capable of rotating freely.

2. An electrical twist vehicle as recited in claim 1, wherein said transmission device further comprises a transmission rod connected to said biasing wheel in such a manner that said biasing wheel is capable of freely rotating with respect to said transmission rod, and is pivotally connected to said vehicle frame such that said biasing wheel is capable of moving pivotally which is governed by said transmission rod about a pivot.

3. An electrical twist vehicle, as recited in claim 2, wherein said transmission system further comprises a connecting rod pivotally connected between said control member and said transmission rod, so that shifting of said control member causes said connecting rod to move pivotally and therefore said transmission rod and biasing wheel to move pivotally with respect to said vehicle frame.

4. An electrical twist vehicle, as recited in claim 1, wherein said transmission system further comprises a rechargeable battery, which is supported in said vehicle frame, electrically connecting with said electrical driving device for providing power to said electrical driving device, and a charging inlet mounted on said vehicle frame for charging up said rechargeable battery.

5. An electrical twist vehicle, as recited in claim 3, wherein said transmission system further comprises a rechargeable battery, which is supported in said vehicle frame, electrically connecting with said electrical driving device for providing power to said electrical driving device, and a charging inlet mounted on said vehicle frame for charging up said rechargeable battery.

6. An electrical twist vehicle, as recited in claim 1, wherein said transmission system further comprises a control panel having an elongated transmitting slot and two retaining slots integrally extended therefrom, which retain said electrical twist vehicle in said manually operated mode and said electrically operated mode respectively, wherein said control member is adapted to pass through said two retaining slots through said transmitting slot so as to shift said electrical twist vehicle from one said mode of operation to another said mode of operation.

7. An electrical twist vehicle, as recited in claim 4, wherein said transmission system further comprises a control panel having an elongated transmitting slot and two retaining slots integrally extended therefrom, which retain said electrical twist vehicle in said manually operated mode and said electrically operated mode respectively, wherein said control member is adapted to pass through said two retaining slots through said transmitting slot so as to shift said electrical twist vehicle from one said mode of operation to another said mode of operation.

8. An electrical twist vehicle, as recited in claim 5, wherein said transmission system further comprises a control panel having an elongated transmitting slot and two retaining slots integrally extended therefrom, which retain said electrical twist vehicle in said manually operated mode and said electrically operated mode respectively, wherein said control member is adapted to pass through said two retaining slots through said transmitting slot so as to shift said electrical twist vehicle from one said mode of operation to another said mode of operation.

9. An electrical twist vehicle, as recited in claim 1, wherein said twisting unit has a first end portion connected to said transmission unit and a second end portion and a third end portion rotatably connected to said pair of twisting wheels respectively.

10. An electrical twist vehicle, as recited in claim 6, wherein said twisting unit has a first end portion connected to said transmission unit and a second end portion and a third end portion rotatably connected to said pair of twisting wheels respectively.

11. An electrical twist vehicle, as recited in claim 7, wherein said twisting unit has a first end portion connected to said transmission unit and a second end portion and a third end portion rotatably connected to said pair of twisting wheels respectively.

12. An electrical twist vehicle, as recited in claim 8, wherein said twisting unit has a first end portion connected to said transmission unit and a second end portion and a third end portion rotatably connected to said pair of twisting wheels respectively.

* * * * *